Nov. 11, 1952        G. F. LINCKS        2,617,908
FLIP-OPEN DISCONNECTING SWITCH
Filed March 27, 1951
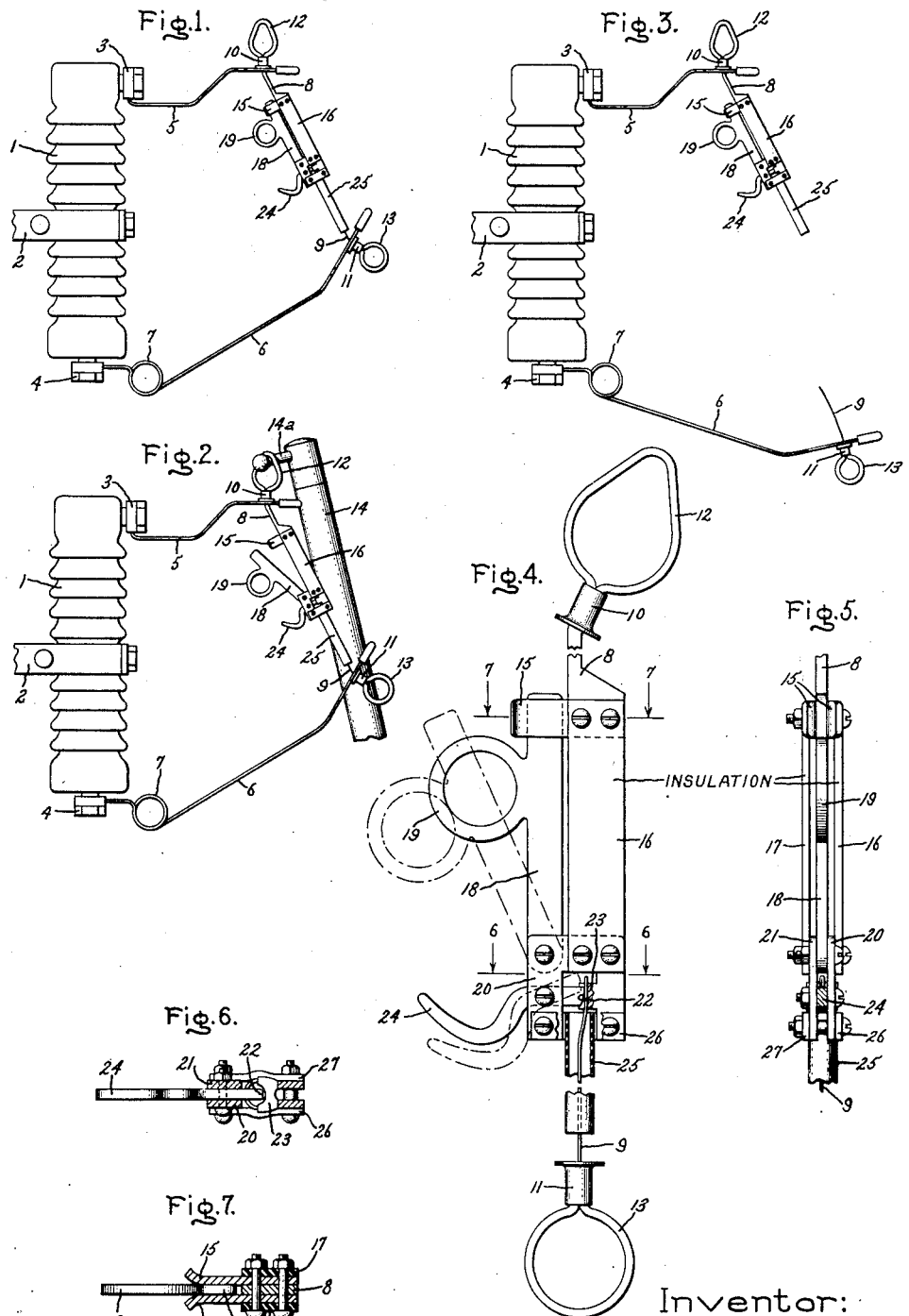
Inventor:
George F. Lincks,
by Ernest C. Britton
His Attorney.

Patented Nov. 11, 1952

2,617,908

UNITED STATES PATENT OFFICE 2,617,908

FLIP-OPEN DISCONNECTING SWITCH

George F. Lincks, Pittsfield, Mass., assignor to General Electric Company, a corporation of New York Application March 27, 1951, Serial No. 217,793

4 Claims. (Cl. 200—114)

My invention relates to electric power connecting and disconnecting switches and more particularly to such switches for use in electrical power distribution systems.

In practice, electrical power transmitted at high voltages is stepped down by transformer substations to voltages in the range of 2,000 to 30,000 volts to supply primary distribution circuits which serve relatively small areas. Low voltage secondary distribution circuits branch from the primary distribution circuits through step-down distribution transformer and supply consumers with electrical power at 120 to 240 volts. Fuse protection in primary distribution circuits is often provided by well known flip-open type cut-outs in which fuse links are supported in tension between spring flipper arms connected in the circuits. When the fuse links blow due to current overloads, the flipper arms spring away from one another and positively separate the two halves of the blown fuse links so that a minimum of arcing occurs.

A particular problem is encountered in the provision of connecting and disconnecting means between primary distribution lines and secondary distribution transformers or power factor correcton capacitors. A switch blade is not a safe means for disconnecting secondary circuits from primary circuits when load current is flowing; and yet, the use of complex circuit breakers or contactors for this purpose is not economically justified, especially for low current distribution circuits such as are found in rural areas.

In the past such secondary circuits have sometimes been disconnected by manually breaking the fuse links in the flip-open type cutouts with an insulated stick, letting the expulsion tube on the fuse link minimize arcing caused by flowing load current. However, this unnecessarily wastes fuse links and thus is not considered a desirable method for interrupting the circuits. Similarly, connections have been made simply by inserting another fuse link in the spring flipper arms of the cutout with an insulated stick, but shaky handling of the stick so that the fuse link terminal wiggles in and out of contact with the flipper arms before being finally secured causes arcing and current surges through the secondary circuits which may be damaging to capacitors and transformers connected therein.

It is, therefore, an object of my invention to provide new and improved connecting and disconnecting means for use in distribution circuits.

It is another object of my invention to provide an effective connecting and disconnecting link for use in flip-open type cutouts.

It is another object of my invention to provide such a connecting and disconnecting link affording positive disconnection of an electric circuit while load current is flowing therein.

It is yet another object of my invention to provide such a connecting and disconnecting link affording positive connection of an electric circuit without causing damaging arcing or current surges to occur.

And it is still another object of my invention to provide in combination a fuse and connecting and disconnecting link for use in flip-open type cutouts.

In carrying out the foregoing objects of my invention, I provide a switching link having terminals adapted to be inserted in the flipper arms of a flip-open type cutout and handling means or loops at the terminals for handling the link with a well known insulated switching stick. The switching link includes a body portion of insulated material having a switch blade pivoted at one end thereof to engage, when closed, fingers mounted upon the other end thereof. Leads extend from the blade pivot structure and from the fingers to the respective terminals. Therefore, to connect a circuit in which there is provided a flip-open type cutout, the switch blade may be opened, the link inserted in the flipper arms with no fear of causing arcing or current surges, and, then, the switch blade closed with one quick and positive movement of the insulated stick.

Secondly, to afford disconnecting action, I provide lever and cam means for attaching one wire lead to either the blade pivot structure or the fingers. Instead of being fastened directly to the link, the wire lead is clamped by the cam surface to either the blade pivot structure or the fingers and extended through a tube of insulating material. When the link is supported under tension between the cutout flipper arms and carrying current, the circuit may be disconnected by pulling down on the cam-controlling lever with an insulated stick to release the wire lead. The spring force of the flipper arms rapidly pulls the wire from the link, thus disconnecting the circuit. Any resulting arc is extinguished as the wire is quickly drawn through the insulation tube. The wire lead may be wholly or partially made of fusible metal, if it is desired, to incorporate fuse protection features into the switching link. When overload currents occur, the fusible metal melts and the wire is separated by the spring action of the flipper arms. Arcing is suppressed by the insulation tube, since the wire melts and separates inside this tube.

The novel features of my invention are pointed out with particularity in the appended claims. However, for a better understanding of the invention, together with further objects and advantages thereof, reference should be had to the following description taken in conjunction with the accompanying drawing in which:

Fig. 1 is a side elevation of the switching link of my invention supported as in use between the flipper arms of a flip-open type cutout, Fig. 2 is a side elevation of the switching link and cutout illustrating the way in which a circuit is connected by the link, Fig. 3 is similar to Fig. 1, illustrating the link and cutout after circuit disconnection, Fig. 4 is a detailed side elevation, partially in section, of the switching link of my invention, Fig. 5 is a front view of the switching link shown by Fig. 4, and Figs. 6 and 7 are sectional views taken along lines 6—6 and 7—7 respectively in Fig. 4.

Referring now to the drawing, there is shown in Figs. 1, 2, and 3 a typical flip-open type cutout comprising an insulator 1 provided with a mounting bracket 2 therefor and having spaced terminals 3 and 4 for connection to an electric circuit, not shown. Flipper arms 5 and 6 are fastened to terminals 3 and 4 respectively and are provided with spring means, such as a coiled section 7 in arm 6, to bias the extremities of the arms away from one another. The extremities of the flipper arms have wedge contact grooves therein to receive and hold in tension a fuse link or switching link.

The switching link of my invention, shown in detail by Figs. 4, 5, 6, and 7, is shown supported between flipper arms 5 and 6 in Fig. 1. Leads 8 and 9 engage arms 5 and 6 in the wedge contact grooves and are provided with collar terminals 10 and 11 to prevent the spring force of coiled section 7 from pulling the leads from the grooves. Handling means such as loops 12 and 13 at terminals 10 and 11 permit the switching link to be inserted into or removed from arms 5 and 6 with an insulated stick, such as an insulated stick 14 having a hook portion 14a shown in Fig. 2. Lead 8 is fastened between and extends from a pair of switch fingers 15 mounted on one end of an insulating body, formed in this illustration from two strips 16 and 17 of insulating material as shown by Fig. 5. Lead 8 is preferably made of a solid unflexible conductor to more rigidly hold the switching link in position during switching operation. Lead 9 extends from a pivot structure, preferably all metallic, mounted on the other end of the insulating body. A switch blade 18, having operating means, such as loop section 19, thereon for operation by insulated stick 14, is pivotally mounted between L-shaped members 20 and 21 to swing into and out of engagement with fingers 15 as shown by Fig. 4. Lead 9 is preferably made of flexible wire or cable in order that it may easily be clamped between a cam 22 and a cooperating grooved member 23. Cam 22 is pivotally mounted between members 20 and 21 to be moved by a lever 24, which in turn is shaped so as to be easily pulled downwardly by insulated stick 14. In the solid line position shown in Fig. 4, cam 22 holds lead 9 firmly clamped against member 23 so that lead 9 cannot be pulled from the switching link by the tensile biasing force of flipper arms 5 and 6. The construction of cam 22 is such that the greater the tensile pull on lead 9, the greater is the clamping force of cam 22. When lever 24 is pulled downwardly to the position shown by dashed lines in Fig. 4, lead 9 is released by cam 22 and may be pulled from the switching link by the spring action of arm 6. A tube 25 of insulating material, through which lead 9 extends, is fastened between clamping members 26 and 27 and serves to aid in extinguishing any arc that occurs when lead 9 is released by cam 22 while carrying current.

I prefer to call the structure formed by L-shaped members 20 and 21, grooved member 23, and clamping members 26 and 27 the "pivot structure" of the link since blade 18 and lever 24 are pivoted between members 20 and 21 which are in turn fastened integrally to one end of strips 16 and 17 and to members 23, 26, and 27. The particular arrangement of the pivot structure is not material to the present invention, and it conceivably might be made in one piece.

To insert the switching link between flipper arms 5 and 6 and thus complete the circuit between terminals 3 and 4, lead 9 is, of course, extended through tube 25 and clamped between cam 22 and member 23 by pushing upward on lever 24. Blade 18 is manually opened and loop 12 placed on hook portion 14a of stick 14. Lead 9 is started into the wedge contact groove of arm 6 and then by an upward push on stick 14, collar 11 is brought to bear on arm 6 and arm 6 is raised, permitting lead 8 to be inserted into the wedge contact groove of arm 5 as illustrated by Fig. 2. The spring biasing force of coiled section 7 pulls collar 10 into bearing with arm 5. Since blade 18 is open and the switching link is non-conductive during this insertion operation, any juggling of lead 8 in and out of contact with arm 5 due to shaky handling of stick 14 cannot cause any arcing or any damaging current surges through connected equipment. The circuit can be completed without arcing or undue current surges by inserting hook portion 14a in loop 19 and closing blade 18 with one quick and positive push on stick 14.

When it is desired to disconnect the circuit, lever 24 is pulled downwardly by hook portion 14a of stick 14, thus causing cam 22 to release lead 9 and permitting the spring force of coiled section 7 to rapidly pull lead 9 through tube 25 so that cutout and switching link appear as illustrated in Fig. 3. Even if considerable current is flowing through the switching link at the time lever 24 is pulled, little arcing will result from the circuit disconnection since lead 9 breaks contact quickly and is pulled through tube 25, which aids in extinguishing any arc, to a considerable displacement from arm 5 and the switching link. Again, the action is a positive, fast action essential to good connecting and disconnecting operations.

After the circuit is disconnected, the switching link may be removed from arm 5 by engaging stick 14 in loop 12 and lead 9 may be removed from arm 6 by engaging stick 14 in loop 13. Lead 9 may then be reclamped between cam 22 and member 23, blade 18 reopened, and the link used to again connect the circuit as hereinbefore described.

The flip-open type cutout and switching link may be employed only for circuit connecting and disconnecting purposes and may thus be wired in series with separate current overload protection devices, such as another flip-open type cutout with a fuse link supported between its arms. However, if it is desired that the switching link serves also as a fuse for current overload protection, lead 9 may be made wholly or partly of a suitable fusible metal drawn to the proper size for the allowable current. Thus, when current overloads occur, lead 9 is melted and flipper arm 6 rapidly pulls the parted sections of lead 9 away from one another to interrupt the circuit with little arcing. If a narrower section of lead 9 is formed to reside in tube 25, the rupture of lead 9 will occur inside tube 25 and arcing will be suppressed by the tube as the overload current is broken.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A flip-open disconnecting switch comprising in combination a flip-open type cutout including an insulator, two arms mounted in spaced relation on said insulator, and spring means biasing the extremities of said arms away from each other; and a switching link carried in tension between the extremities of said arms including a body of insulation material, a switch blade pivotally mounted on said body, operating means on said switch blade, switch fingers mounted on the other end of said body to cooperate with said blade, two electrical leads one each electrically connected to and extending from said blade and said fingers, terminals on said leads engaging said arms, lever and cam means on one end of said body removably clamping one of said leads, whereupon actuation of said lever means releases said one lead and said spring means separates said one lead from the remainder of said link.

2. A connecting and disconnecting switching link for use with a flip-open type cutout comprising a body of insulation material, a switch blade pivotally mounted on one end of said body, operating means on said blade, switch fingers mounted on the other end of said body to cooperate with said blade, two electrical leads one each electrically connected with and extending from said blade and said fingers, terminals on the ends of said leads to be received by said cutout, handling means on said terminals, cam and lever means on one end of said body removably clamping one of said leads, and an insulation tube through which said one lead is extended.

3. A connecting and disconnecting switching link for use with a flip-open type cutout comprising a body of insulation material, a switch blade pivotally mounted on one end of said body, operating means on said blade, switch fingers mounted on the other end of said body to cooperate with said blade, two electrical leads one each electrically connected with and extending from said blade and said fingers, terminals on the ends of said leads to be received by said cutout, handling means on said terminals, cam and lever means on one end of said body removably clamping one of said leads, and an insulation tube through which said one lead is extended, said one lead being of fusible metal to melt and rupture when a predetermined electrical current passes through it.

4. For use with a flip-open type cutout, a connecting and disconnecting switching link to be operated by use of an insulated stick comprising a body of insulation material, a pivot structure mounted on one end of said body, a switch blade pivotally mounted on said pivot structure, operating means on said blade for blade operation by said stick, switch fingers mounted on the other end of said body to cooperate with said blade, a first electrical lead connected to and extending from said fingers, a lever pivotally mounted on said pivot structure to be operated by said stick, a cam carried by said lever, a second lead removably clamped to said pivot structure by said cam, an insulation tube clamped to said pivot structure through which said second lead extends, terminals on said two leads to be received by said cutout, and handling means on said terminals for handling said link with said stick.

GEORGE F. LINCKS.

REFERENCES CITED

The following references are of record in the file of this patent:

UNITED STATES PATENTS

| Number | Name | Date |
| --- | --- | --- |
| 2,319,161 | Schultz | May 11, 1943 |
| 2,324,044 | Triplett et al. | July 13, 1943 |
| 2,438,746 | Garrison | Mar. 30, 1948 |